(12) United States Patent
Smith

(10) Patent No.: US 6,542,882 B1
(45) Date of Patent: Apr. 1, 2003

(54) SYSTEM AND METHOD FOR PROVIDING A DATABASE OF CONTENT HAVING LIKE ASSOCIATIONS

(75) Inventor: Kim C. Smith, Colleyville, TX (US)

(73) Assignee: Gateway, Inc., Poway ( * ) Notice: Subject to any disclaimer, the term of this patent is extended or adjusted under 35 U.S.C. 154(b) by 0 days.

(21) Appl. No.: 09/298,005

(22) Filed: Apr. 22, 1999

(51) Int. Cl.[7] .............. G06F 17/30; G06F 7/00; G06F 17/00
(52) U.S. Cl. .............. 706/46; 706/45; 707/3; 707/6; 707/104.1
(58) Field of Search .............. 706/11, 46, 45; 345/327; 707/3, 6, 104.1

(56) References Cited

U.S. PATENT DOCUMENTS

| | | | | |
|---|---|---|---|---|
| 5,491,796 A | * | 2/1996 | Wanderer et al. | 706/46 |
| 5,526,034 A | * | 6/1996 | Hoarty et al. | 348/7 |
| 5,664,227 A | * | 9/1997 | Mauldin et al. | 706/46 |
| 5,740,230 A | * | 4/1998 | Vaudreuil | 379/88 |
| 5,740,231 A | * | 4/1998 | Cohn et al. | 379/89 |
| 5,835,667 A | * | 11/1998 | Wactlar et al. | 386/96 |
| 5,873,080 A | * | 2/1999 | Coden et al. | 707/3 |
| 5,917,808 A | * | 6/1999 | Kosbab | 370/254 |
| 5,945,988 A | * | 8/1999 | Williams et al. | 345/327 |
| 5,991,799 A | * | 11/1999 | Yen et al. | 709/218 |
| 6,038,614 A | * | 3/2000 | Chan et al. | 710/1 |
| 6,052,676 A | * | 4/2000 | Hekmatpour | 706/11 |
| 6,141,003 A | * | 10/2000 | Chor et al. | 345/327 |
| 6,163,817 A | * | 12/2000 | Shteyn et al. | 710/8 |
| 6,167,395 A | * | 12/2000 | Beck et al. | 707/3 |
| 6,169,543 B1 | * | 1/2001 | Wehmeyer | 345/327 |
| 6,172,677 B1 | * | 1/2001 | Stautner et al. | 345/352 |
| 6,182,287 B1 | * | 1/2001 | Schneidewend et al. | 725/48 |
| 6,201,538 B1 | * | 3/2001 | Wugofski | 345/327 |
| 6,219,839 B1 | * | 4/2001 | Sampsell | 725/40 |
| 6,222,531 B1 | * | 4/2001 | Smith | 345/327 |
| 6,243,713 B1 | * | 6/2001 | Nelson et al. | 707/104.1 |
| 6,282,549 B1 | * | 8/2001 | Hoffert et al. | 707/104.1 |
| 6,288,716 B1 | * | 9/2001 | Humpleman et al. | 345/329 |
| 6,321,382 B1 | * | 11/2001 | Wugofski | 725/59 |
| 6,338,096 B1 | * | 1/2002 | Ukelson | 709/319 |
| 6,339,672 B1 | * | 1/2002 | Ando et al. | 386/95 |

* cited by examiner

*Primary Examiner*—John A. Follansbee
*Assistant Examiner*—Kelvin Booker
(74) *Attorney, Agent, or Firm*—Scott Charles Richardson; Richard P. Gilly; Wolf, Block, Schorr & Solis-Cohen

(57) ABSTRACT

A method, signal, system, interface, and software for creating a database containing information across all media source types are disclosed. The database contains preprocessed links established on the basis of being "like" in some manner. The pre-processed links are created giving regard to the media source type and are stored in a database based on whether a link has a basis in the same media type or for all media types. The information and links contained within the database are accessed by a search tool via a multimedia user interface.

26 Claims, 6 Drawing Sheets

SYSTEM AND METHOD FOR PROVIDING A DATABASE OF CONTENT HAVING LIKE ASSOCIATIONS

CROSS REFERENCE TO RELATED APPLICATIONS

U.S. patent application Ser. No. 09/354,052 filed Jul. 15, 1999 entitled "A Method of Searching Across Media and Source Types" of common assignee herewith, Gateway Reference No. 98-0883, incorporated herein by reference.

U.S. patent application Ser. No. 09/299,826 filed Apr. 26, 1999 entitled "A Method of Maintaining Search Results Pages" of common assignee herewith, Gateway Reference No. 98-0881, incorporated herein by reference.

U.S. patent application Ser. No. 09/374,781 filed Aug. 16, 1999 entitled "Presenting Content Selection Options Across Media Source Types" of common assignee herewith, Gateway Reference No. 98-0880, incorporated herein by reference.

U.S. patent application Ser. No. 09/298,006 filed Apr. 22, 1999 entitled "A Method of Creating Default Lists of Content Probable Interest" of common assignee herewith, Gateway Reference No. 98-0884, incorporated herein by reference.

FIELD OF THE INVENTION

The present invention relates generally to information and more particularly to information across all media types.

BACKGROUND OF THE INVENTION

On the forefront in the advances of the home entertainment industry is the emergence of multimedia sources available to a new generation of home entertainment systems, namely, convergence systems. PCs, TVs, DVDs, CD players, EPGs, etc., are being converged into one system providing users a broad spectrum of potential home entertainment. What is lacking, however, is the capability to view the voluminous information associated with all of the media sources in one coherent user interface.

In merging components into one system (i.e., PCs, TVs, DVDs, EPGs, etc.), convergence systems contain several different media source types. For example, PCs store information in several different file formats, requiring users to search for the desired information, electronic program guides, or EPGs, contain information for current and future television programming, and the Internet contains a plethora of information on virtually any subject. As more components are added to convergence systems, new media source types are generated, forcing the user to utilize a plurality of user interfaces to cull through large quantities of information until the desired information is obtained.

For example, when a user wants to locate a file on a personal computer, the user must open a local search tool that will search for files and list the found files by name, date, extension, etc. Advanced searches for content contained within files may be performed, but depending on the efficiency of the system and the types of files searched, the user may be left with lengthy wait times for a search that may produce useless information.

In another example of searching across more than one media source type, suppose a user wanted to locate what TV channel a sporting event is airing and further wanted to listen to a radio or Internet broadcast of the sporting event in lieu of listening to the TV announcers. This would prompt the user to open an EPG, locate the event, and further open a web browser and/or search engine of some sort to locate an Internet address or radio broadcast station covering the sporting event, requiring the user to switch between applications to access the desired information.

A further shortcoming of present systems is the inability to provide data that is representative across all media source types. For example, suppose a user used a web browser and search engine to locate information about a movie and further wanted to find the movie's soundtrack, a home page for the movie, or a pay-per-view cable channel airing the movie. The user would have to make a separate inquiry to find the desired media information. Current databases fail to merge all types of media information (PC, EPG, DVD, etc.) to provide a complete and comprehensive resource of multimedia information.

By convergence systems not providing a user with data across all media types and sources, they fall short of total convergence of available information. Therefore, what is needed is a system, interface, software, method, and signal to provide a user with information across all media source types.

SUMMARY OF THE INVENTION

Accordingly, the present invention provides a method comprising the steps of maintaining content information from a plurality of content sources of one or more types and maintaining a database of like associations to the content information wherein the associations correspond to at least one content source type.

The present invention also provides a system comprising at least one processor, memory operably coupled to the processor, a plurality of content sources of one or more types for providing content information, and a database of like associations to the content information wherein the associations correspond to at least one content source type.

The present invention also provides a computer readable medium tangibly embodying a program of instructions, the program of instructions implementing the method of maintaining content information from a plurality of content sources of one or more types and maintaining a database of like associations to the content information wherein the associations correspond to at least one content source type.

The present invention also provides a graphical user interface (GUI) comprising means for maintaining content information from a plurality of content sources of one or more types and means for maintaining a database of like associations to the content information wherein the associations correspond to at least one content source type.

The present invention also provides a signal embodied in a propagation medium comprising at least one instruction configured to provide content information from a plurality of content sources of one or more types and at least one instruction configured to create a database of like associations to the content information wherein the associations correspond to at least one content source type.

It is an object of the present invention to provide a database containing links of like items of the same media type.

It is another object of the present invention to provide a database containing links of like items of all media types.

It is a further object of the present invention to provide a multimedia database with pre-processed links of like information.

One advantage of the present invention is its ability to provide a user searchable information for one media type.

Another advantage of the present invention is its ability to provide a user searchable information for all media types.

A further advantage of the present invention is its ability to provide pre-processed multimedia information links.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
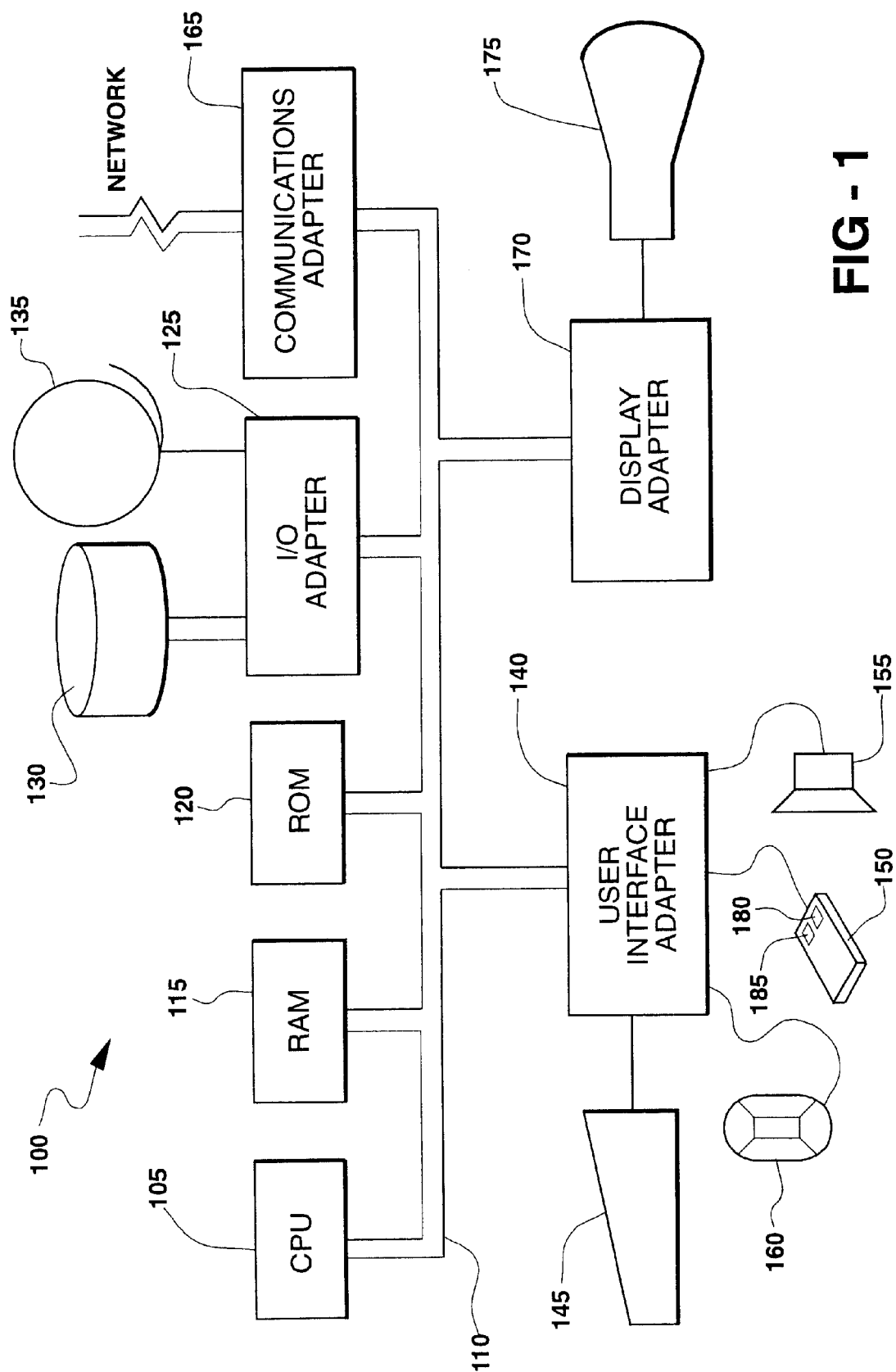
FIG. 1. illustrates a detailed block diagram showing a computer system according to a preferred embodiment of the present invention.

A representative hardware environment for practicing the present invention is depicted in FIG. 1 which illustrates a typical hardware configuration of an information handling system 100 in accordance with the present invention, having a central processing unit 105 such as a conventional microprocessor and a number of other units interconnected via at least one system bus 110. Information handling system 100 may be, for example, a portable or desktop Gateway computer or a Gateway Destination system (Gateway and Destination are trademarks of Gateway 2000, Inc.). Information handling system 100 shown in FIG. 1 includes random access memory (RAM) 115, read-only memory (ROM) 120, and input/output (I/O) adapter 125 for connecting peripheral devices such as disk units 130 and tape drives 135 to system bus 110, a user interface adapter 140 for connecting keyboard 145, mouse 150, speaker 155, microphone 160, and/or other user interface devices to system bus 110, communications adapter 165 for connecting information handling system 100 to an information network such as the Internet, and display adapter 170 for connecting system bus 110 to a display device such as monitor 175. Mouse 150 has a series of buttons 180, 185 and is used to control a cursor shown on monitor 175.

Figure 2:
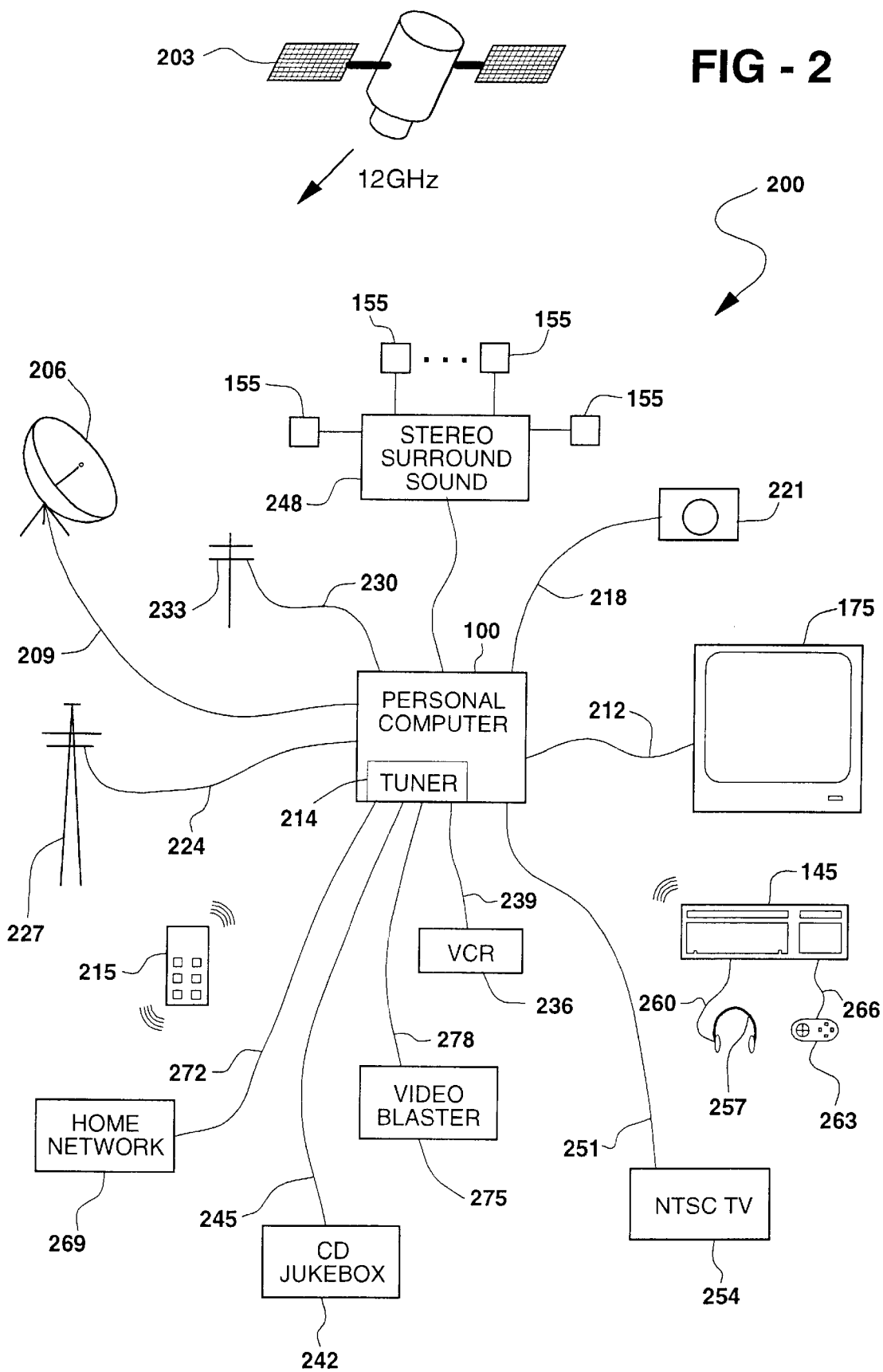
FIG. 2 illustrates a detailed block diagram showing a convergence system according to the preferred embodiment of the present invention.

Referring next to FIG. 2, a home entertainment or convergence system such as the Gateway Destination System mentioned above is shown generally at 200. Reference numerals or letters in FIG. 2 which are like, similar, or identical to the reference numerals or letters of FIG. 1 indicate like, similar, or identical components or features. External to convergence system 200 is satellite 203 which in one preferred embodiment is a HS601 model operated by Hughes at a 101 degree west longitude geosynchronous orbital location and which transmits signals comprising 150 channels of modulated digital video, audio, and data at a frequency of about 12 GHz. The satellite signals are received by home entertainment system 200 through antenna 206 containing a low noise block converter amplifier. Antenna 206 is preferably about 18 inches in diameter and receives left- and right-hand circularly polarized signals between 12.2 and 12.7 GHz. Antenna 206 provides a "downconverted-spectrum" signal between 950 and 1450 MHZ via a coaxial cable or other suitable communication medium 209 to information handling system 100 such as a personal computer or other system or circuitry capable of processing data. Suitable antennas 206 are already being manufactured and sold by RCA Corporation via direct sales and through numerous major retail chains such as Radio Shack.

System 100 contains circuitry and software to further process signals from the antenna, generally demodulating and decoding the signal to produce a VGA (video graphics adapter) signal. The VGA signal is provided via a standard VGA-compatible monitor cable to drive large screen data quality monitor 175 which is suitable for viewing in a family room or entertainment room environment. System 100 provides for user input by means of remote controls 215 and 145. Remote control 215 comprises a hand-held size device with standard television controls and a numeric keypad and, in one embodiment, VCR (video cassette recorder) controls and a pointing device. It provides RF (radio frequency) or IR (infrared) control signals received by system 100. Remote control 145 is a full function personal computer keyboard with additional standard television and VCR controls and a pointing device which is preferably in the form of a touchpad, and it also provides RF control signals to system 100. RF control signals were selected over IR control signals or hardwired connections in one embodiment due to the home entertainment environment. RF control allows the system to be in a different room from monitor 175, or if in the same room, a clear line of sight is not required. In another embodiment, IR control signals were selected because of the standard circuitry available at a low cost. Monitor cable 212 is a standard type cable typically used on VGA display devices and comprises up to 15 electrical conductors interfacing with monitor 175 in a D-series shell connector. In one embodiment, full multi-media sourcing and destinationing of audio/video/data (A/V/D) broadcast is provided for.

Information handling system 100 may include a tuner 214, tuner circuitry, or card capable of both tuning to multiple channels and receiving television information or signals in the form of the NTSC (National Television Standards Committee) or PAL (Phase Alteration Line) forms from any medium such as from a cable system or from a digital satellite system. One embodiment of the signal on cable 209 from satellite dish 206 provides digital A/V/D signals from such sources as DirecTV or Primestar (DirecTV is a trademark of DirecTV, Inc. and Primestar is a trademark of Primestar Partners, L.P.). In another such embodiment, the signal on cable 209 provides analog A/V such as NTSC (National Television Systems Committee) antenna signals. In another such embodiment, the signal on cable 218 from camera 221 provides analog A/V such as NTSC audio/video signals. In further embodiments, the signal on cable 224 from cable-data source 227 provides analog and/or digital A/V/D. In further such embodiments, the signal on cable 230 from PSTN (Public Switched Telephone Network) 233 provides data or phone signals such as ISDN (integrated services digital network) or POTS (plain old telephone system) signals. In one set of such embodiments, system 100 is programmed to automatically record analog signals such as television programming onto recordable media such as a video tape in VCR 236 coupled to cable 239. In another such set of embodiments, system 100 is programmed to automatically record digital signals such as digital television programming or CD-ROM (Compact Disk-Read Only Memory) type audio onto recordable media such as recordable compact disks in CD/DVD jukebox 242 coupled to cable 245. CD/DVD jukebox 242 also plays CDs, CD-ROMs, or DVD-ROMs for use elsewhere. In another such embodiment, signals are sent to stereo surround sound system 248 for audio output to one or more speakers 155, and on cable 251 to TV 254. In one such embodiment, earphones 257 on cable 260 and gamepad 263 on cable 266 provide additional input/output through remote control 145. Home network 269 is "smart wiring" used to transmit data and control within the home, coupled by cable 272 to system 100. Videoblaster 275 provides video signal processing on cable/connector 278. Cables 224, 209, 230, 218, 251, 239, 278, 245, 260, and 266 can be wired coupling or wireless, such as RF or IR.

One example of convergence system 200 is the Destination System using the DestiVu user interface manufactured and sold by Gateway 2000, Inc. In this manner, convergence system 200 is a fully functional computer integrated with a television providing TV viewing (via broadcast, cable, satellite, VCR, digital disk, or other broadcast media) and personal computing functionality. This convergence of computer and television enables a user the combined access to both television programs and information as well as computer related functionality such as computer information and programs and Internet access.

Although many of today's televisions employ much of the same hardware resources employed by computers such as information handling system 100, it is possible that the present invention might be practiced in other electronic devices or in networked electronic devices. For example, with the development of audio/video networking such as the recently proposed HAVi standard, television sets or other audio/video devices such as audio/video receivers and VCRs that do not themselves contain such resources could implement the present invention by utilizing the resources of other devices on a network.

Figure 3:
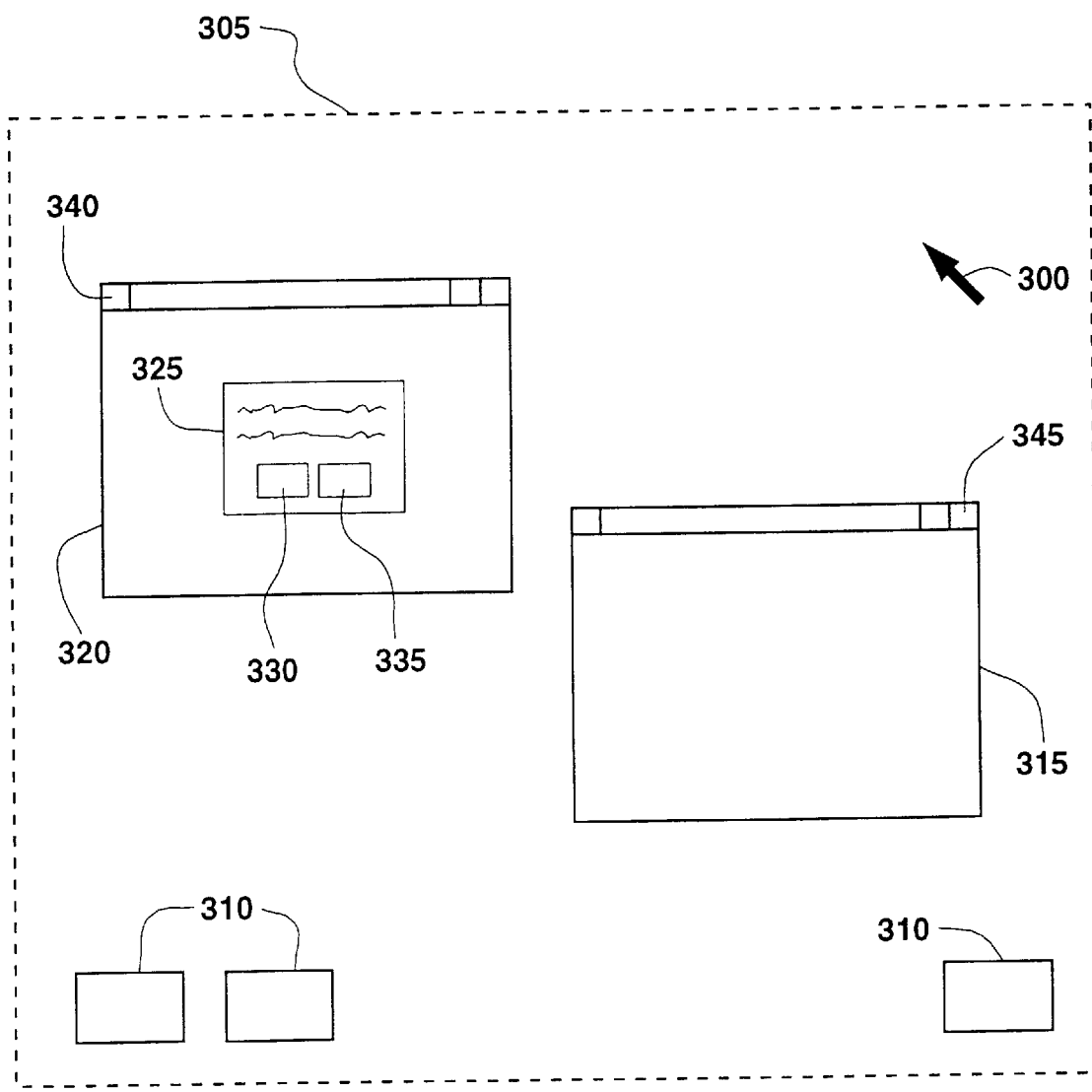
FIG. 3 shows the desktop of a computer operating system user interface typically employed on a computer system as in FIGS. 1 and 2 according to the preferred embodiment of the present invention.

Referring next to FIG. 3, a detail of an operating system's graphical user interface, or GUI, as is typically displayed on monitor 175 in accordance with the present invention is illustrated. Reference numerals or letters in FIG. 3 which are like, similar, or identical to the reference numerals or letters of FIGS. 1–2 indicate like, similar, or identical components or features. The operating system shown in FIG. 3 is IBM's OS/2 (OS/2 is a trademark of International Business Machines Corporation), however, the present invention will work with DestiVu, Windows 98, Windows 95 (DestiVu is a trademark of Gateway 2000 Inc. and Windows 98 and Windows 95 are trademarks of Microsoft Corporation), or any other graphical user interface. This GUI includes cursor 300, desktop 305, three icons 310, two windows 315, 320, and dialog box 325, all of which are well known in the art. Dialog box 325 further contains two buttons 330, 335. Programs are represented by the graphical user interface as either icons 310 or windows 315, 320. The horizontal region along the top of a window is called the "title bar" 340, 345. A program window 315, 320 has the "focus" when it has been designated by the user or by the operating system to receive input from keyboard 145 or mouse 150. In OS/2®, the user gives the window focus by clicking a mouse button 180, 185 when cursor 300 is inside that window. Some operating systems, however, give a window the focus merely whenever cursor 300 is present within that window. The operating system indicates which program has the focus by changing the color of the focused window's title bar 340, 345.

Now that a hardware environment and user interface to practice the present invention have been described, a further understanding of content source types, or media source types, and their relationship to databases must be conveyed. In the preferred embodiment of the present invention, a link is an association made between one type of information and another. Information today is commonly presented through the Internet where a search engine accesses databases with links to periodicals, advertisements, home pages, etc., of interest to the user. This information is accessed through the use of a web browser, but an individual is at a loss when wanting to access information local to the system being used. For example, if a user wanted to access all available jazz music CDs available to system 100/200 or executable files for all available action adventure games that exist on the system, the user must search for each of these items autonomously. The present invention bridges the gap between media source types, providing a means for accessing like or similar information across all media source types, creating a kind of "Media Thesaurus" for the user.

Figure 4:
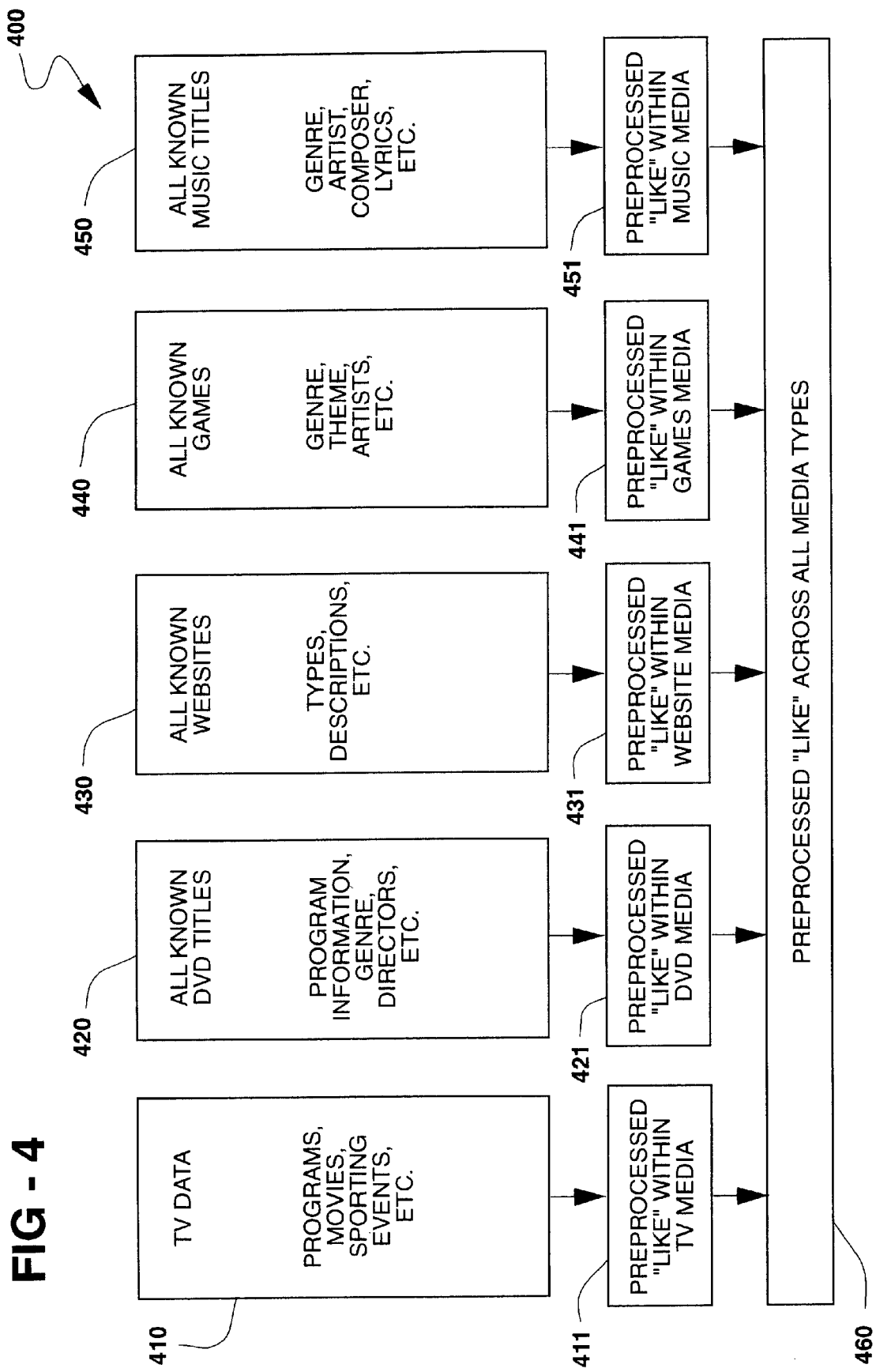
FIG. 4 is an illustration of a database according to the preferred embodiment of the present invention.

Referring now to FIG. 4, an illustration of a database according to the preferred embodiment of the present invention is shown, wherein reference numerals or letters in FIG. 4 which are like, similar, or identical to the reference numerals or letters in FIGS. 1–3 indicate like, similar, or identical components or features. FIG. 4 illustrates a database 400 generally and contains multiple sections with information relating to specific media source types. Illustrated is TV data 410 with information relating to programs, movies, sporting events, etc. DVD titles 420 contains program information, genre, directors, etc. Websites 430 contains information relating to types, descriptions, etc. Also contained in database 400 is a section relating to games 440 containing information relating to the genre, theme, artist, etc. Database 400 also contains a music section 450 with information on the genre, artist, composers, lyrics, etc. Each of the sections contained in database 400 are not limited to the information shown. The information (i.e., programs, types, games, etc.) are shown to indicate examples of the types of information that are contained within each media section where it can be appreciated by those skilled in the art that a plurality of types of information may be added to each media section. Additionally, database 400 contains information relating to five media source types, but it can also be appreciated by those skilled in the art that as more media types and sources become available, database 400 may be modified to include the new resources and associated information.

Also contained within database 400 are two types of pre-processed links relating to "like" or similar information. The first type of pre-processed links are within the same media type (i.e., TV), and the second type of pre-processed links is for all media types (i.e., TV, DVD, Website, Games, Music, etc.). The first type of pre-processed "like" links within the same media type is contained within database 400 for each media type. Therefore, pre-processed links exist for TV media 411, DVD media 421, Website media 431, Games media 441, and Music media 451. The links are created using information contained within each unique media type. For example, in the pre-processed "like" within Games media 441, there would exist links for all games with the same theme (i.e., action, adventure, etc.).

The pre-processed links across all media types 400 contains links for items that are "like" or similar across all media types. The links are created to provide a user a complete database of multimedia availability for an item. For example, suppose a user wanted to find information relating to a type of dancing called "line dancing." All media types 460 section could contain links to country music titles for line dancing obtained from music titles 450, websites containing chat rooms to discuss the "latest moves in line dancing" obtained from Websites 430, a DVD track with a "Learning to Line Dance in 30 Minutes with Bubba" available from the DVD titles 420, and TV data containing information on a network broadcast "Line Dance USA" obtained from TV data 410. The pre-processed "like" across all media types 460 contains all of the media links between items that are like or similar to provide the user information across all of the media types. Therefore, database 400 and the contents therein will be quite voluminous by nature.

Figure 5:
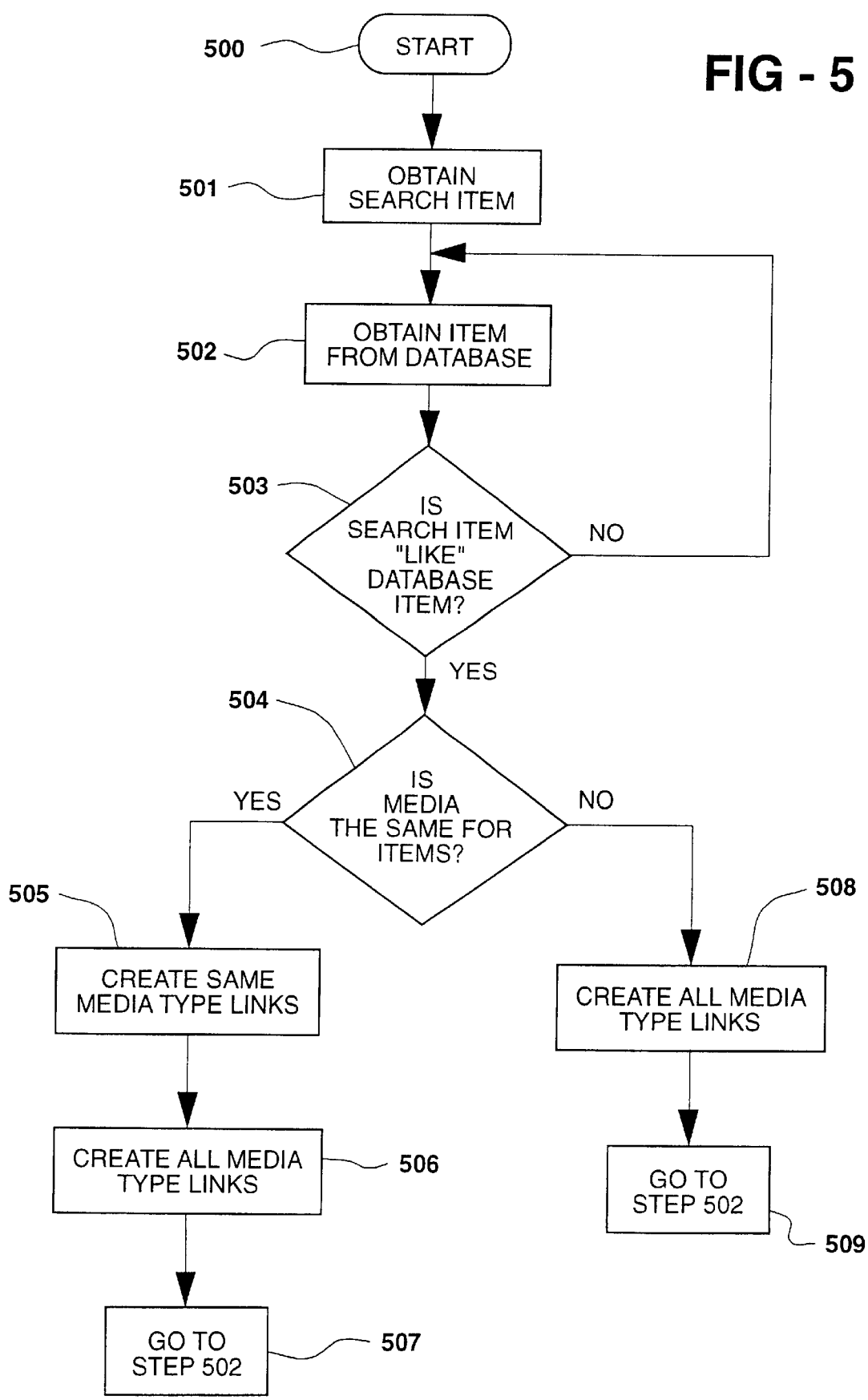
FIG. 5 is an illustration of a method according to the preferred embodiment of the present invention.

Referring now to FIG. 5, a method according to the preferred embodiment of the present invention is shown, wherein reference numerals or letters in FIG. 5 which are like, similar, or identical to the reference numerals or letters in FIGS. 1–4 indicate like, similar, or identical components or features. The method is used to create the pre-processed links contained in database 400. The method searches each section of database 400 and, upon finding like or similar information, creates a link to be stored in the pre-processed link sections 411, 421, 431, 441, 451, and/or 460. The search item to be compared is a predefined item obtained from a separate list or possibly even obtained from a user where search items and search criteria are well known in the art. The "like" criteria is also predefined by a user or a system with a reasonable level of intelligence being deployed in defining the "like" criteria. The method begins at step 500. At step 501, a search item is obtained to be used for searching database 400. The method proceeds to step 502 where the database item is obtained to be compared. The database may be searched in any possible way known in the art to obtain an item from database 400 with a complete search exhausting all resources within database 400. The method then proceeds to step 503 where the search item of step 501 is compared to the database item obtained in step 502. If the items are like or similar as noted above, the method proceeds to step 503. Conversely, if the items are not like or similar, the method returns to step 502 and obtains a new database item from database 400. The "No" branch of step 503 will be repeated until database 400 has exhausted of all entries or items to be compared to the item obtained in step 501.

At step 503, when a like or similar item is encountered, the method proceeds to step 504 where the media type of the search item and database item is compared. For example, if the search item was the DVD title "Jurassic Park" and the database item was the movie soundtrack to "Jurassic Park," the items would be "like" as determined in step 503 but would be different in that they came from different media source types as determined at step 504. If the media source type is not the same for both items, the method proceeds to step 508 where a link is created in the preprocessed "like" across all media types section 460 of database 400. The method then proceeds to step 509 and subsequently 502 where the method repeats until database 400 is exhausted.

Conversely, if it is determined at step 504 that the search item and database item are like or similar, the method proceeds to step 505 where a same type media link is created for the specific media type, i.e., TV, DVD, games, etc. The method then proceeds to step 506 where a link is also added to the all media type 460 since the specific media type item is a part of all types of media. The method then proceeds to step 507 and subsequently 502 where the method repeats until database 400 is exhausted. The above method may be varied in several ways without departing from the true spirit of the invention. In one embodiment, database 400 could provide both the search item of 501 and the database item of 502. Additionally, the preprocessed links of database 400 may be used as search items/database items or even as the search criteria used to establish a likeness or similarity.

In one embodiment of the present invention database 400 can be updated dynamically. As new or updated information becomes available, the present invention can be modified to dynamically update database 400 upon receipt of the information. This ensures that the most current information is being used to create "like" links for users. Also, database 400 can be a remote database such as a server operably associated with system 100 or a local database operably associated with system 100. Database 400 may also be stored using a combination of local and remote storage means operably associated to system 100. Those skilled in the art can appreciate that information, and modification and storage thereof, may be configured in a plurality of ways without departing from the spirit and scope of the present invention.

In another embodiment of the present invention, the method can be modified to monitor the selecting habits of users and create "like" links for database 400 based upon several users' selection habits. For example, the present invention can monitor purchase activities such as people who buy music title "A" and also buy music title "B" and make a link based upon this "likeness" accordingly. Therefore, when a new user selects music title "A," the method would suggest music title "B" as a "like" link and vice versa. When creating this type of "like" link, the method is not cognizant of the contents of the music titles (i.e. genre, artists, lyrics, etc.), but is aware that a large number of people have selected both music titles and there is an affinity that exists between the titles based upon the selecting habits of users.

Figure 6:
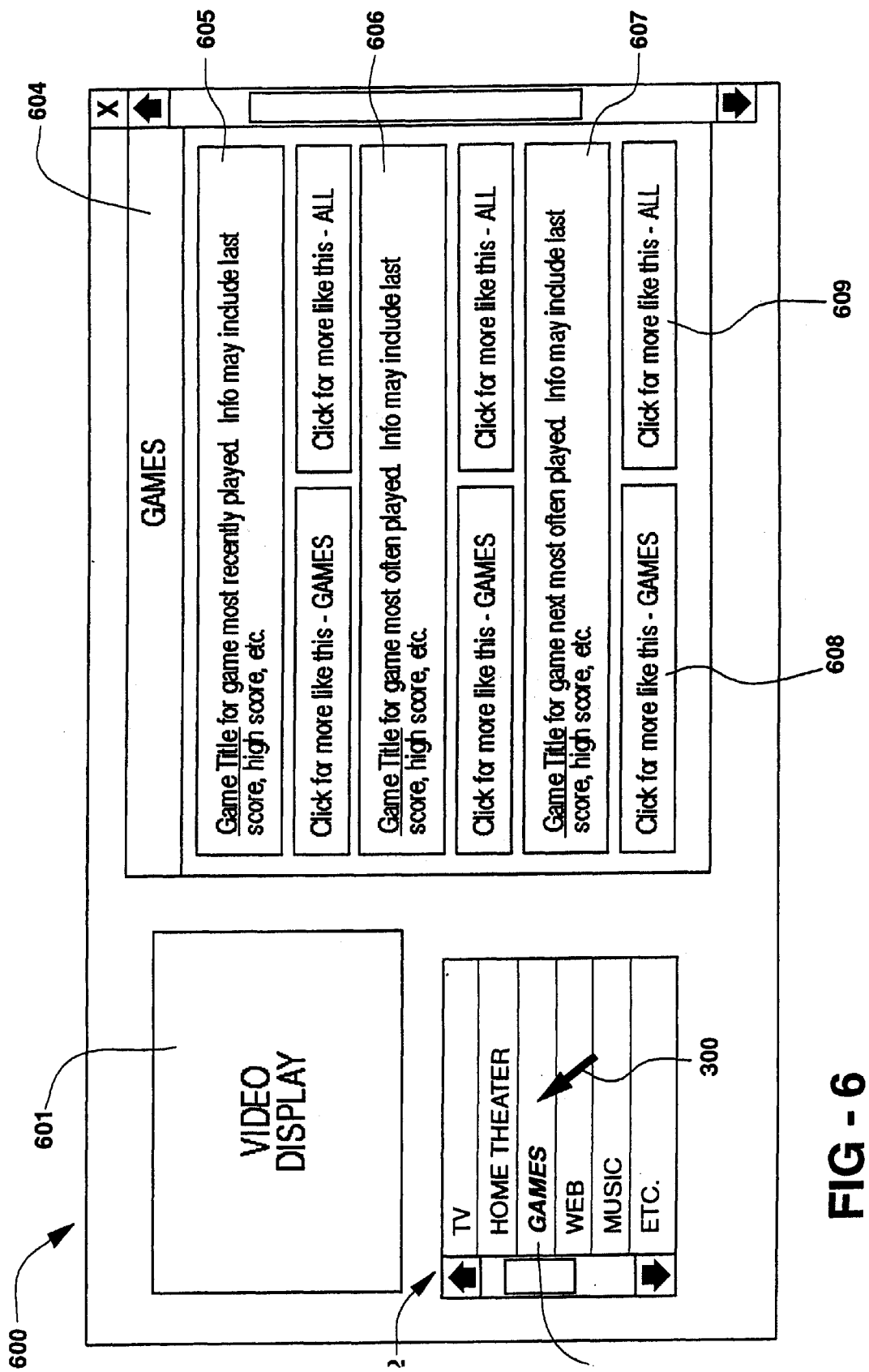
FIG. 6 is an illustration of a user interface according to the preferred embodiment of the present invention.

Referring now to FIG. 6, a user interface according to the preferred embodiment of the present invention is shown, wherein reference numerals or letters in FIG. 6 which are like, similar, or identical to the reference numerals or letters in FIGS. 1–5 indicate like, similar, or identical components or features. The user interface is disclosed in co-pending application GW 98-0880, "Method for Presenting Content Selection Options Available Across Media and Source Types," and the search method is disclosed in co-pending application GW 98-0883, "Method of Searching Across Media and Source Types." The user interface is shown generally by interface 600 and contains three main sections: a video display 601, a media menu 602, and a search contents menu 604. In alternate embodiments, any combination of these elements may be displayed plus additional information such as a date and time indicator, channel number for video display, a program menu bar, etc., without departing from the true spirit of the invention. User interface 600 may be used to search for and display information pertaining to media source types. Search content menu 604 displays information for the media type selected using pointer 300 and media menu 602, wherein utilization of pointer 300 and selection of menu items are well known in the art. In the example illustrated, the games media reference 603 is selected and available information illustrated in search contents menu 604. Menu 604 contains a list of game titles such as most recently played 605, most often played 606, and subsequent next most often played games 607. Each of the cells contains a title of the game and may contain additional information such as the highest score, the latest score, etc. Menu 604 also contains additional search options to provide more information for each game title. The "Click more like this-GAMES" button 608 allows a user to search for additional games information. When the user selects option 608, a search is performed on databases 400 to find game information that is "like" the game title displayed. Menu 604 also contains a "Click for more like this-ALL" button 609 for each of the entries and allows a user to search for information across all media types relating to the associated game title. This search involves accessing databases 400 for information that is "like" the game title in all media source types and involves finding information relating to the game title across all media types (TV, DVD, Web, etc.) and will be displayed for the user to access and narrow the search.

In conclusion, the present invention provides a multimedia database containing links of the same media source type and links across all media source types. The links are established based upon the criteria of being "like" or similar. The database includes several sections for source types such as TV data, DVD titles, Websites, Games, Music titles, etc., and contains information relating to each media source type. Each media section is then used to expand the database to include two types of preprocessed links for information that is "like" or similar in some way. The first type of link is created if the link is "like" or similar information from the same media source type, thus creating an extended list of links for the same media type. The second type of link created is for information that is "like" or similar but from different media source types, thus providing a user information across all available media source types. Therefore, both types of links provide a user access to information across all media types and enable the user to view information for a single media type or for all available media types.

Although an embodiment of the present invention has been shown and described in detail herein along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–6. Until required by the computer system, the set of instructions may be stored in another computer readable memory, for example, in a hard disk drive or in a removable memory such as an optical disk for eventual use in a CDROM drive or a floppy disk for eventual use in a floppy disk drive. Further, the set of instructions can be stored in the memory of another computer or encoded or embodied in a signal, such as an analog or digital signal, embodied in a propagation medium and transmitted over the propagation medium by a user. The propagation medium may include a local area network or a wide area network, such as the Internet, or other propagation medium. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

I claim:

1. A computer-implemented method comprising the following steps:

obtaining content information from a plurality of content sources of one or more types to create a database;

comparing a search item with the one or more database items of the plurality of content sources to determine whether content information of one or more of the plurality of content sources of one or more types is like content information of another one or more of the plurality of content sources of one or more types obtained in said obtaining step; and creating at least one link of like associations to the content information when the search item and the database items are like or similar as determined in said comparing step, wherein the associations correspond to at least one content source type.

2. The method, as recited in claim 1, wherein the like associations include associations to like content information based upon like criteria.

3. The method, as defined in claim 1, wherein the like associations are pre-processed.

4. The method, as defined in claim 1, wherein the like associations further includes associations for same content source types.

5. The method, as defined in claim 1, wherein the like associations further includes associations for all content source types.

6. The method of claim 1, further comprising dynamically updating the database.

7. A system, comprising:

at least one processor;

memory operably coupled to the processor;

a plurality of content sources of one or more types for providing content information; and at least one link of like associations to the content information created by comparing a search item with the content information, wherein the associations correspond to at least one content source type, wherein said processor executes instructions stored in said memory to create the like associations to the content information of said database.

8. The system, as defined in claim 7, wherein said like associations include associations to like content information based upon like criteria.

9. The system, as defined in claim 7, wherein said like associations are pre-processed.

10. The system, as defined in claim 7, wherein said like associations further include associations for same content source types.

11. The system, as defined in claim 7, wherein said like associations further include associations for all content source types.

12. A graphical user interface (GUI) comprising:
means for obtaining content information from a plurality of content sources of one or more types;
means for comparing a search item with the content information to determine whether content information of one or more of the plurality of content sources of one or more types is like content information of another one or more of the plurality of content sources of one or more types obtained by said obtaining means; and
means for creating at least one link of like associations to the content information as determined by said comparing means wherein the associations correspond to at least one content source type.

13. The GUI, as defined in claim 12, wherein said like associations include associations to like content information based upon like criteria.

14. The GUI, as defined in claim 12, wherein said like associations are pre-processed.

15. The GUI, as defined in claim 12, wherein said like associations further includes associations for same content source types.

16. The GUI, as defined in claim 12, wherein said like associations further includes associations for all content source types.

17. A computer readable medium tangibly embodying a program of instructions, the program of instructions implementing the method of:
obtaining content information from a plurality of content sources of one or more types;
comparing a search item with the content information to determine whether content information of one or more of the plurality of content sources of one or more types is like content information of another one or more of the plurality of content sources of one or more types obtained in said obtaining step; and
creating at least one link of like associations to the content information as determined in said comparing step wherein the associations correspond to at least one content source type.

18. The computer readable medium, as defined in claim 17, wherein the like associations include associations to like content information based upon like criteria.

19. The computer readable medium, as defined in claim 17, wherein the like associations are pre-processed.

20. The computer readable medium, as defined in claim 17, wherein the like associations further includes associations for same content source types.

21. A signal embodied in a propagation medium, said signal comprising:
at least one instruction configured to provide content information from a plurality of content sources of one or more types; and
at least one instruction configured to create a database of like associations to the content information wherein the associations correspond to at least one content source type, wherein the associations are determined by comparing a search item with the content information.

22. A signal embodied in a propagation medium, said signal comprising:
at least one instruction configured to provide content information from a plurality of content sources of one or more types; and
at least one instruction configured to create a database of like associations to the content information wherein the associations correspond to at least one content source type.

23. The signal, as defined in claim 22, wherein the like associations include associations to like content information based upon like criteria.

24. The signal, as defined in claim 22, wherein the like associations are pre-processed.

25. The signal, as defined in claim 22, wherein the like associations further includes associations for same content source types.

26. The signal, as defined in claim 22, wherein the like associations further includes associations for all content source types.

* * * * *